Patented Sept. 26, 1922.

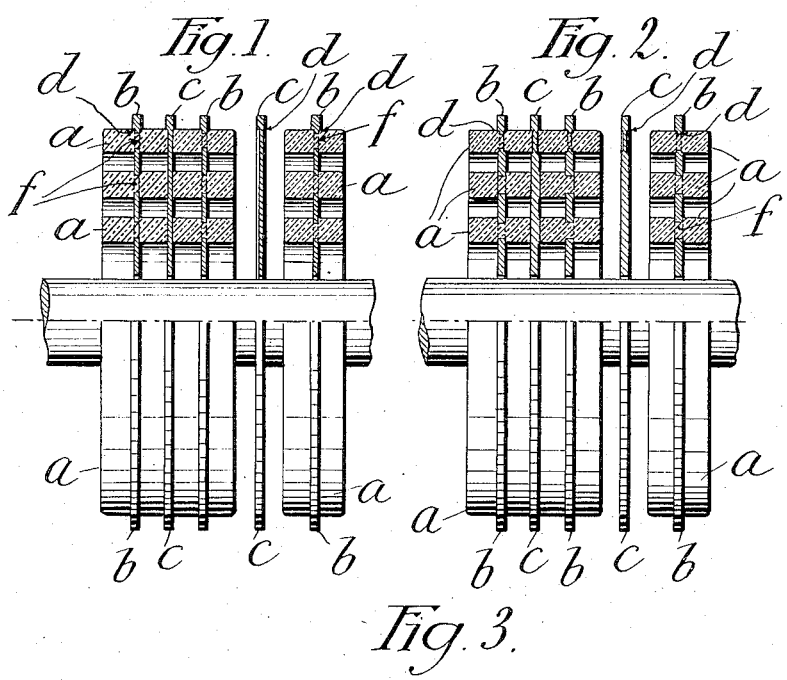

1,430,230

UNITED STATES PATENT OFFICE.

CHARLES WILLIAM CRESSWELL HINE, OF DORKING, ENGLAND.

BUFFER AND OTHER SPRINGS CONSTRUCTED OF INDIA RUBBER.

Application filed May 18, 1920. Serial No. 382,270.

(GRANTED UNDER THE PROVISIONS OF THE ACT OF MARCH 3, 1921, 41 STAT. L., 1313.)

*To all whom it may concern:*

Be it known that I, CHARLES WILLIAM CRESSWELL HINE, a subject of the King of Great Britain and Ireland, residing at "Moleway," Dorking, in the county of Surrey, England, have invented Improvements in or Relating to Buffers and Other Springs Constructed of India Rubber, of which the following is a specification.

This invention relates to buffer or other springs of the kind comprising two or more india rubber rings arranged concentrically one within the other and to which is moulded a metal plate formed with perforations through which extend india rubber fillings that connect the india rubber rings at opposite sides of the plate together and maintain the india rubber rings at the desired distance apart. In use on railway or like vehicles it is the general practice to assemble a number of such springs in column form, on a buffer or draw rod or bar, for example, and to separate the adjacent springs or spring elements of the column by interposed metal dividing plates or rings against which the india rubber rings abut.

The relative positions of the concentric india rubber rings on the metal plates in springs of the kind in question are such that, when fully compressed the inner india rubber rings bear with their inner peripheries against the buffer or draw rod on which the spring is mounted and the outer and inner peripheral faces of the concentric india rubber rings of the set bear one against the other excepting of course the said inner peripheral surfaces of the inner india rubber rings and the outer peripheries of the outer india rubber rings. The result is that the inner and intermediate rings mutually support each other whereas there is a tendency when the spring is compressed to force the outer india rubber rings outwardly from their proper positions on the metal plates to which they are connected or against which they bear and this is resisted effectively according to the present invention by providing the plates with annular marginal shoulders that surround and confine the end faces of the said outer india rubber rings. The confining shoulder may be constituted by the outer wall of a recess or groove in the said plate in which recess or groove the outer india rubber ring is received or seated.

As a result of numerous tests and from observations as to the actual working of springs of the kind under notice in practice it is found that the life of a spring is greatly increased if moisture is prevented from entering the annular spaces enclosed by the india rubber rings. Normally the compound spring constituted by the column of springs or spring elements with metal dividing plates as set forth above is under such initial stress that moisture cannot freely pass within the outer india rubber rings of the sets of concentric rubber rings but moisture tends to creep from the marginal portions of the plates past the outer india rubber rings towards the centre, this is prevented however in the improved spring by the hereinbefore mentioned shoulder which prevents outward movement of the outer ring relatively to the plate.

Fig. 1 of the accompanying drawing illustrates partly in central longitudinal section and partly in side elevation a compound or column spring of the type under notice embodying the invention.

Fig. 2 is a similar view to Fig. 1 showing a modification.

Fig. 3 shows in elevation a portion of one of the metal plates moulded into the rubber rings.

The spring shown comprises three spring elements each consisting of three concentric india rubber rings $a$ located at each side of a metal plate $b$ that is moulded into them and maintains them the desired distance apart. As usual the metal plates $b$ are formed with holes through which extend india rubber fillings $f$ that connect together the india rubber rings at opposite sides of the plates. Metal dividing plates $c$, not connected to the interposed india rubber rings are located between the spring elements as shown. For the sake of clearness the spring element and the corresponding dividing plate $c$ at the right hand sides of the figures are shown separated from each other and from the other spring elements of the spring column.

The metal plates $b$ are each formed with a marginal shoulder $d$, Figs. 1 and 3, say one thirty second of an inch or so in depth to prevent outward movement of the outer india rubber rings relatively to the plate.

As shown in Fig. 2 the shoulder $d$ may constitute the outer wall of a recess adapted to receive the outer india rubber rings.

In like manner, as shown the dividing plates c may be formed with a restraining shoulder d for the outer india rubber rings although in some cases the dividing plates may be plain. In other cases the dividing plates may have the restraining shoulder and the plates c be plain.

As will be understood the invention is not limited to a spring with three concentric india rubber rings as there may be but two india rubber rings in some cases and in others four or more india rubber rings may be provided.

What I claim is:—

1. A spring comprising concentrically-arranged rubber rings, metal dividing plates associated with said rings and formed with annular marginal shoulders to surround and confine the end faces of the outer rubber rings, the surfaces of said dividing plates from the outer rings inwardly being unobstructed to permit the peripheries of the inner rings to move relative to the plate.

2. A spring as claimed in claim 1, wherein the low annular marginal shoulders that confine the end faces of the outer rubber rings are constituted by the outer walls of shallow recesses in said plates in which recesses the end faces of the outer rubber rings only are seated.

3. A spring comprising a number of india rubber rings arranged concentrically one within the other and to which is moulded a metal plate formed with perforations through which extend india rubber fillings that connect the said india rubber rings at opposite sides of the plate, the said plate having at each side a low marginal shoulder that surrounds and confines the end face of the outer india rubber ring at the corresponding side of the plate, such shoulders normally engaging a short length of the outer periphery of the ring.

4. A spring comprising a number of india rubber rings arranged concentrically one within the other and to which is moulded a metal plate formed with perforations through which extend india rubber fillings that connect the said india rubber rings at opposite sides of the plate, the said plate being formed at each side with a shallow annular recess within which the end face of the outer india rubber ring at the corresponding side of the plate is seated, the outer wall of such recess forming a low shoulder that normally engages a short length of the outer periphery of the ring.

5. A number of springs as claimed in claim 3 arranged in column form and separated by metal plates formed with low marginal shoulders adapted to surround and confine the end faces of the outer india rubber rings which bear against the said plates, such shoulders normally engaging a short length of the outer periphery of the rings.

6. A number of springs as claimed in claim 3 arranged in column form and separated by metal plates formed with shallow recesses adapted to receive the end faces of the outer india rubber rings which bear against the said plates, the outer walls of such recesses normally engaging a short length of the outer periphery of the rings.

Signed at London, England, this 21st day of April, 1920.

CHARLES WILLIAM CRESSWELL HINE.